United States Patent
Zhao et al.

(10) Patent No.: US 7,646,726 B2
(45) Date of Patent: *Jan. 12, 2010

(54) SYSTEM FOR DETECTING PACKETIZATION DELAY OF PACKETS IN A NETWORK

(75) Inventors: Yongdong Zhao, Pleasanton, CA (US); Sean Chen, Sunnyvale, CA (US); Zesen Chen, Pleasanton, CA (US); Shih-Chung Tom Soon, Dublin, CA (US); Holly Chen, San Ramon, CA (US)

(73) Assignee: AT&T Intellectual Property 1, L.P., Reno, NV (US)

( * ) Notice: Subject to any disclaimer, the term of this patent is extended or adjusted under 35 U.S.C. 154(b) by 948 days.

This patent is subject to a terminal disclaimer.

(21) Appl. No.: 11/149,439

(22) Filed: Jun. 9, 2005

(65) Prior Publication Data

US 2006/0280163 A1 Dec. 14, 2006

(51) Int. Cl.
  *H04J 1/16* (2006.01)
  *H04L 12/28* (2006.01)
(52) U.S. Cl. .................. 370/252; 370/392
(58) Field of Classification Search .......... 370/252, 370/392
  See application file for complete search history.

(56) References Cited

U.S. PATENT DOCUMENTS

| | | | |
|---|---|---|---|
| 6,542,504 B1 | 4/2003 | Mahler et al. | |
| 6,674,744 B1 | 1/2004 | Doshi et al. | |
| 6,798,786 B1 | 9/2004 | Lo et al. | |
| 7,027,434 B2 * | 4/2006 | De Vleesschauwer et al. | 370/352 |
| 7,391,765 B2 * | 6/2008 | Tezuka et al. | 370/356 |
| 7,397,819 B2 * | 7/2008 | Kobayashi | 370/469 |
| 7,463,652 B2 * | 12/2008 | Karol et al. | 370/476 |
| 2002/0018443 A1 * | 2/2002 | Vleesschauwer et al. | 370/229 |
| 2002/0087370 A1 * | 7/2002 | Brueckheimer et al. | 709/223 |
| 2003/0105799 A1 | 6/2003 | Khan et al. | |
| 2003/0107991 A1 | 6/2003 | Tezuka et al. | |
| 2003/0112758 A1 | 6/2003 | Pang et al. | |
| 2003/0189900 A1 * | 10/2003 | Barany et al. | 370/229 |
| 2004/0042601 A1 * | 3/2004 | Miao | 379/202.01 |
| 2005/0036512 A1 | 2/2005 | Loukianov | |
| 2006/0280184 A1 * | 12/2006 | Chen et al. | 370/395.21 |

OTHER PUBLICATIONS http://www.manually.sk/protocols2/voip/rtp_header.htm, pp. 1-2, Jun. 6, 2005.
http:/www.erg.abdn.ac.uk/user.gorry/course/inet-pages/ip-packet.html., IP Packet Header, pp. 1-2, May 30, 2005.
http://www.networksorcery.com/enp/protocol/udp.htm., pp. 1-4, Jun. 6, 2005.

* cited by examiner

*Primary Examiner*—Andrew Lee
(74) *Attorney, Agent, or Firm*—Brinks Hofer Gilsn & Lione

(57) ABSTRACT

A system is disclosed for detecting packetization delay of packets in a network. The system includes a router to receive at least one packet containing data. A detection system, which is in communication with the router, extracts a codec information and a packet length information from the packet. A management system, which is in communication with the router, receives the codec information and the packet length information and determines packetization delay based on the codec information and the packet length information.

14 Claims, 6 Drawing Sheets

| Codec And Packet Length | Paketization Delay (ms) |
|---|---|
| G.711, 120 | 10 |
| G.711, 200 | 20 |
| G.711, 280 | 30 |
| G.711, 360 | 40 |
| G.723ar53, 60 | 30 |
| G.723ar53, 80 | 60 |
| G.723ar53, 64 | 30 |
| G.723ar63, 88 | 60 |
| G.726r16, 60 | 10 |
| G.726r16, 80 | 20 |
| G.726r16, 100 | 30 |
| G.726r16, 120 | 40 |
| G.726r24, 70 | 10 |
| G.726r24, 100 | 20 |
| G.726r24, 130 | 30 |
| G.726r24, 160 | 40 |
| G.726r32, 80 | 10 |
| G.726r32, 120 | 20 |
| G.726r32, 160 | 30 |
| G.726r32, 200 | 40 |
| G.728, 60 | 10 |
| G.728, 80 | 20 |
| G.728, 100 | 30 |
| G.728, 120 | 40 |
| G.729, 50 | 10 |
| G.729, 60 | 20 |
| G.729, 70 | 30 |
| G.729, 80 | 40 |

SYSTEM FOR DETECTING PACKETIZATION DELAY OF PACKETS IN A NETWORK

FIELD OF THE INVENTION

The invention relates to a system and method for generally detecting network congestion, and more particularly for detecting voice-over Internet protocol (VoIP) congestion.

BACKGROUND

Voice-over Internet protocol (VoIP) services have been gaining much attention from communication service providers, their customers and potential customers. VoIP is voice delivered on a network using an Internet Protocol. In general, this means sending voice information in digital form in discrete packets rather than in the traditional circuit-committed protocols of the public switched telephone network (PSTN). Communication service providers are using VoIP technology to offer end users more cost-effective voice services across the provider's data infrastructure. These services are typically delivered to customers through a broadband access network, such as a digital subscriber line (DSL) access network. VoIP technology may be used as the foundation for new multimedia communication services that may address mobility and cost reduction concerns to customers. VoIP may also optimize the communication service providers' PSTN network costs, such as when used to transport bulk voice traffic over a shared IP data network.

To ensure the quality of communication messages sent using VoIP, VoIP imposes stringent quality of service (QoS) constraints such as on network mouth-to-ear delay, jitter and packet loss. Mouth-to-ear delay is the delay incurred from the moment the speaker utters words until the instant the listener hears them. The mouth-ear-delay for VoIP-based communications should not exceed 150 ms. The end-to-end jitter may be limited to less than 30 ms and packet loss ratio should not exceed more than 0.5%. To achieve such a level of QoS, the communication service provider may have to provision a large amount of network resources, such as bandwidth, to support the VoIP application. Network bandwidth demanded by VoIP traffic may be closely tied to the codec and the packetiztion delay used by the VoIP codec. A wrong encoder/decoder (codec) or packetiztion delay of a customer on the network can cause prolonged network congestion and excessive VoIP packet loss. Therefore, that customer and other customers may experience service degradation and interruption.

DETAILED DESCRIPTION

A system is described that a communications service provider may use to diagnose and report packet-based traffic on a communications network. More particularly, communication service providers may detect causes for packet-based delay and congestion on the communications network. The system may be used to detect encoder/decoders (codecs) used for sending packet-based voice messages, and other packet-based parameters.

Figure 1:
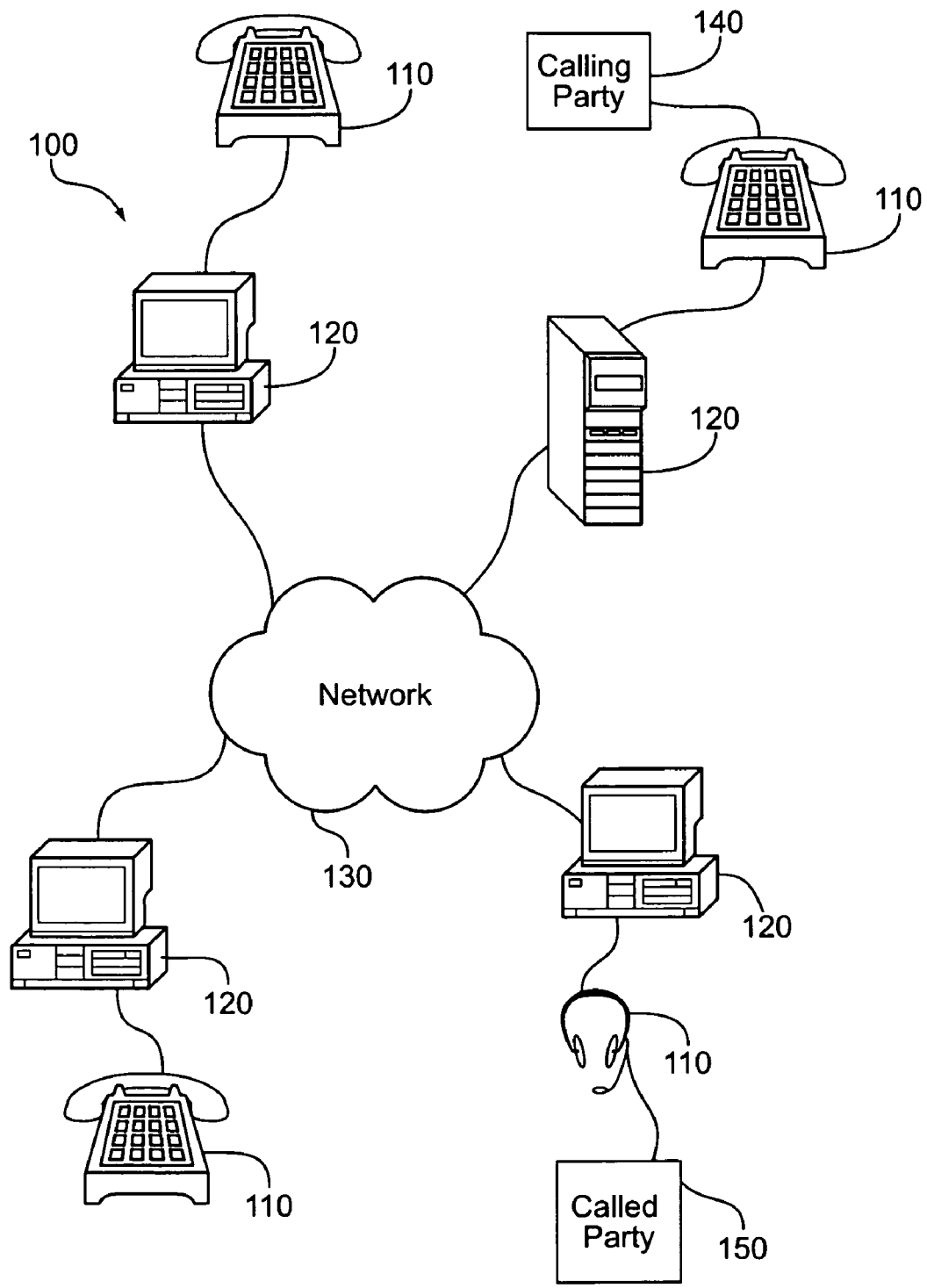
FIG. 1 is a block diagram of a communications system.

FIG. 1 is a block diagram of a communications system 100 that provides voice communications using packet-based messages. The communications system allows for a calling party 140 and a called party 150 to speak to each other in substantially real time. The communications system 100 includes communication devices 110 that connect to each other via processors 120 over a network 130, such as an Internet protocol (IP) network. The communications devices 110 include voice-type communications devices including telephones, such as phones used with landlines, mobile phones, satellite phones, BLACKBERRY's and the like such as computers having a microphone and a speaker. The communications devices 110 may include hand-held or hands-free devices. The processors 120 may be included in such devices such as desk top computers, laptop computers and servers. The communications devices 110 and the processors 120 may be implemented as one or more physical devices.

The network 130 includes local area networks (LANs) and wide area networks (WANs), such as the Internet. The network 130 includes signal bearing mediums that may be controlled by software, applications and/or logic. The network 130 may be implemented with a network based virtual private network (VPN or NVPN) service. A VPN is a network that may be constructed by using public wires to connect nodes. The VPN may enable the communication service provider to create networks using a packet-switching network such as the Internet as the medium for transporting data. VPN systems may use encryption and other security mechanisms to ensure that only authorized users can access the network and that the data cannot be intercepted.

In a packet-switching network, the voice and non-voice data in a message or file may be broken up into a sequence of packages. Each of these packages gets a wrapper that includes information on the sender's address, the receiver's address, the package's place in the entire message, and how the receiving computer can identify that the package arrived intact. Each data package, called a packet, is then sent off to its destination via a best available route. The route of one packet may be taken by all, some or none of the other packets in the message. The network 130 may balance the load across various pieces of equipment on a millisecond-by-millisecond basis. The packets may travel through copper cables, fiber optics, microwaves and satellites and the like. The recipient may communicate with the sender in substantially real time.

Being able to communicate in substantially real time means that communications, such as voice communications, from the calling party 140 to the called party 150 may occur substantially immediately. Conversely, non-substantially real time communications, such as sending a text message as a .WAV file via email, may cause a recipient of the message to take a few seconds, or even minutes, to respond. Real time can also refer to events simulated by a computer at the same speed that they would occur in real life. The network 130 provides the users with the sense of real time communications that they may experience when speaking with each other using traditional circuit-committed telephone communications.

Figure 2:
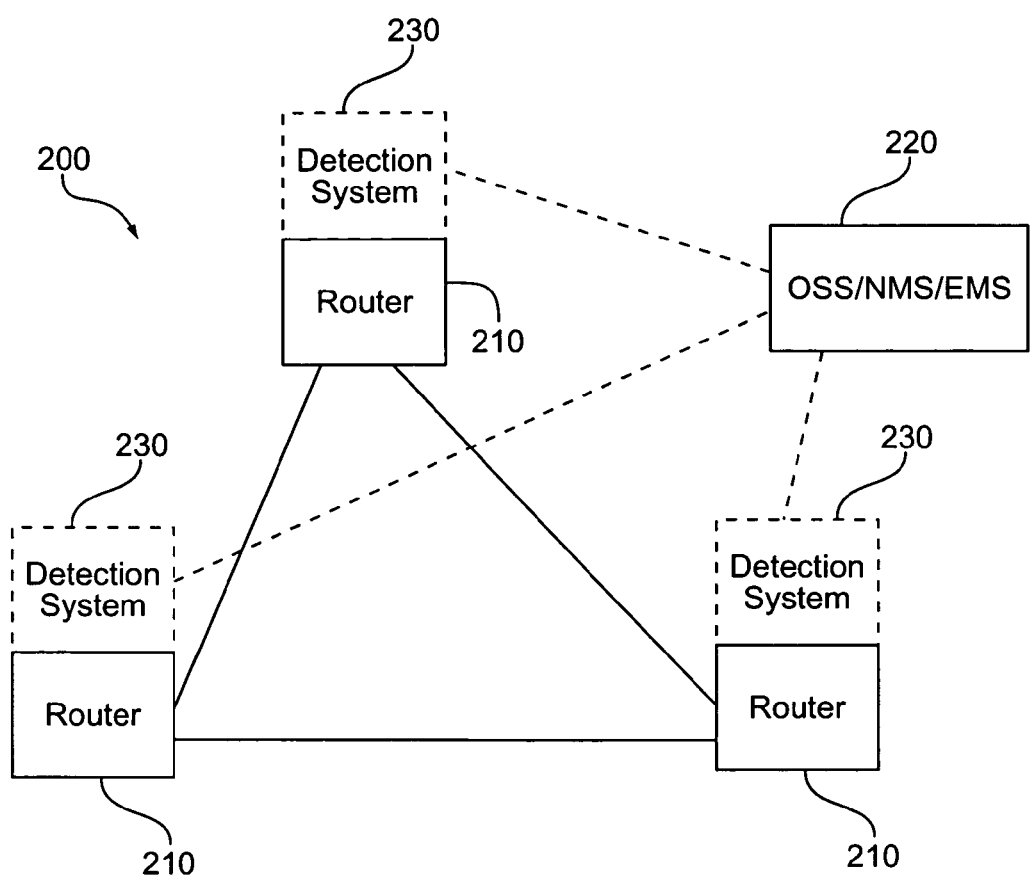
FIG. 2 is a block diagram illustrating exemplary components of the network of the communications system.

FIG. 2 is a block diagram illustrating exemplary components 200 of the network 130. The components 200 include at least one router 210 that connects with an operating support system (OSS), network management system (NMS) and/or element management system (EMS). TELCORDIA TECHNOLOGIES and SYNDESIS are examples of companies that produce systems that may be deployed by the communications service provider. The OSS, NMS and/or EMS include logic such as software, hardware and/or firmware systems that operators of the communications service provider may use to control and monitor their networks. The software includes operatable routines stored in a memory. The memory refers to any computer storage mechanism that supports a magnetic storage medium, an optical storage medium, an electronic storage medium, or any other suitable storage medium, as described in more detail below. The router 210 may include specialized computers and applications that send the packet-based messages between networks, such as between a network of the calling party 140 and a network of the called party 150.

The router 210 includes a detection system 230. The detection system 230 may be implemented with software, hardware, and/or firmware. The detection system 230 allows communication service providers to detect a codec, and also to detect other network variables such as packet length and/or packetization delay used by a VoIP call. Information about the codec and packetization delay may be used to help provide better service to the customers, as will be described in more detail below. The detection system 230 may be implemented together with or separate from the router 210. Each router 210 may include a detection system 230 or the routers may share one or more detection systems 230.

Figure 3:
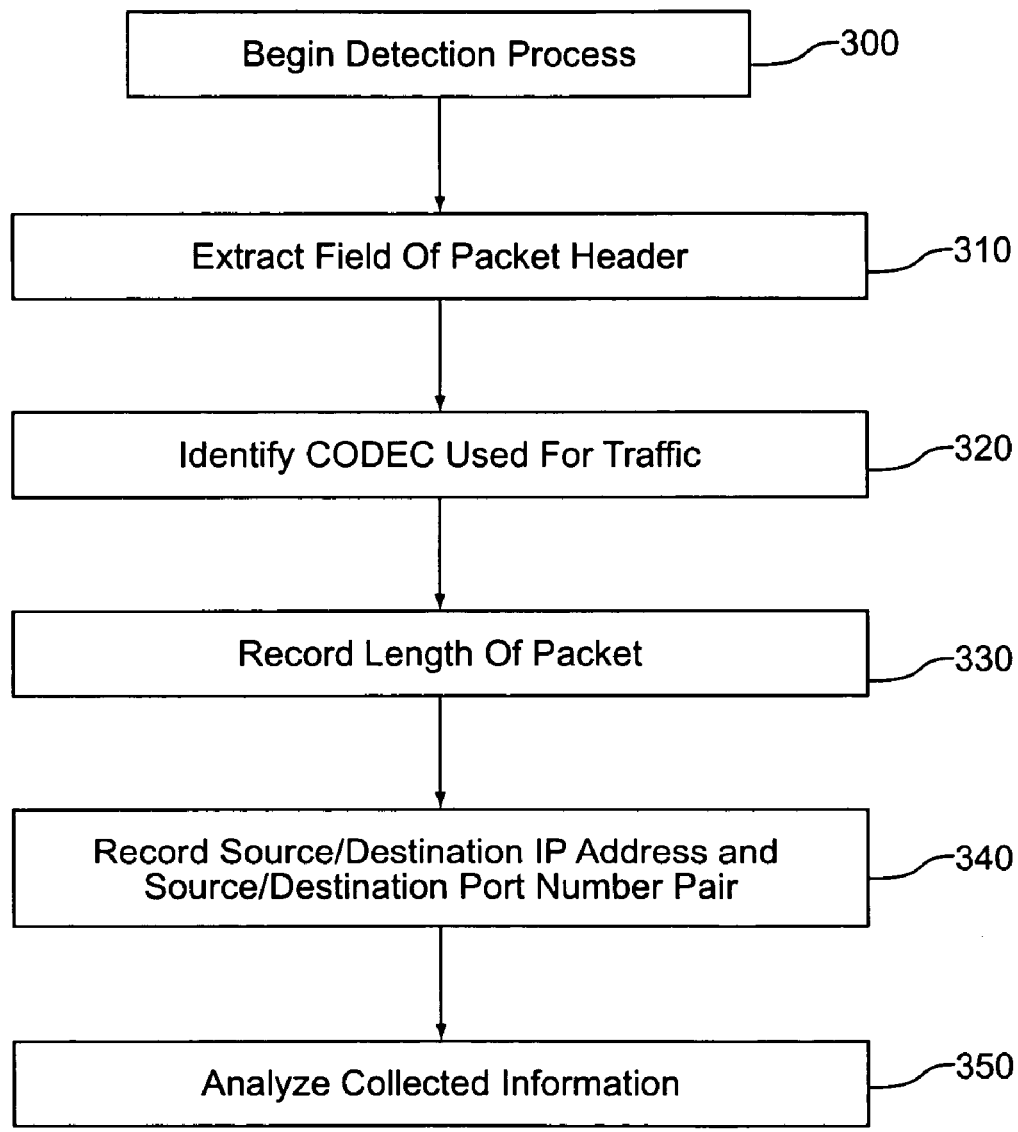
FIG. 3 is a flow chart of an operation of a detection system of the communications system.

FIG. 3 is a flow chart of an operation of the detection system 230 of the communications system 100. At block 300, such as by using the detection system 230, the router 210 begins to detect the codec and packetization delays of packet-based messages received by the router 210. The router 210 may limit the detection to VoIP packets. The detection may occur when the router 210 begins to experience congestion and packet loss for VoIP traffic, or at other intervals, such as periodically or randomly.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories; or a signal containing computer instructions being sent in a network environment. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

Accordingly, the present invention contemplates a computer readable medium containing instructions, or that which receives and executes instructions from a propagated signal so that a device connected to a network environment can send or receive voice, video or data, and to communicate over the network using the instructions. The instructions form one or more routines that are executable to permit the device to operate in a desired manner.

Additionally, it will be understood that a device of the present invention includes broadly any electronic device that provides voice, video or data communication, such as a telephone, a cordless telephone, a mobile phone, a cellular telephone, a Personal Digital Assistant (PDA), a set-top box, a computer, and/or a server.

At block 310, the router 210 extracts a field of a packet header for inspection. If the VoIP traffic is sent using Real-Time Transport Protocol (RTP), an Internet protocol for transmitting real-time data such as audio and video, the router inspects the RTP header. RTP does not guarantee real-time delivery of data, but provides mechanisms for the sending and receiving applications to support streaming data.

Figure 4:
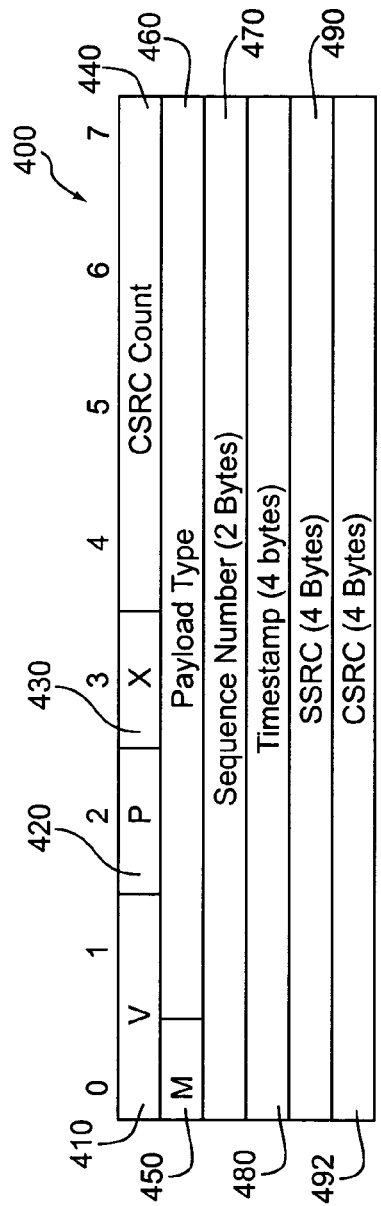
FIG. 4 is a diagram of an RTP header.

FIG. 4 is a diagram of an RTP header 400. The RTP header 400 includes a version field 410 that identifies the RTP version and a padding packed 420, which, when set, indicates that the packet contains one or more additional padding octets at the end of the packet, which are not part of the payload. The RTP header 400 also includes a RExtension bit 430, which, when set, indicates that the fixed header is followed by exactly one header extension, with a defined format. The RTP header 400 also includes a CSRC count 440 which contains the number of CSRC identifiers that follow the fixed header. Marker 450 allows events such as frame boundaries to be marked in the packet stream. Payload type field 460 identifies the codec used by the VoIP call. The sequence number 470 increments by one for each RTP data packet sent, the timestamp 480 reflects the sampling instant of the first octet in the RTP data packet, the SSRC 490 identifies the synchronization source, and the CSRC 492 identifies the contributing sources for the payload contained in the packet.

RTP may run on top of a User Datagram Protocol (UDP), although the specification is general enough to support other transport protocols such as Transmission Control Protocol (TCP). UDP is a connectionless protocol that may send a message without establishing a connection with the recipient, by sending the message to the network 130 with a destination address. In contrast, connection-oriented protocols require a channel to be established between the sender and receiver before any messages are transmitted. UDP/IP offers a direct way to send and receive datagrams over an IP network. The IP may use UDP for broadcasting RTP messages over a network.

Figure 5:
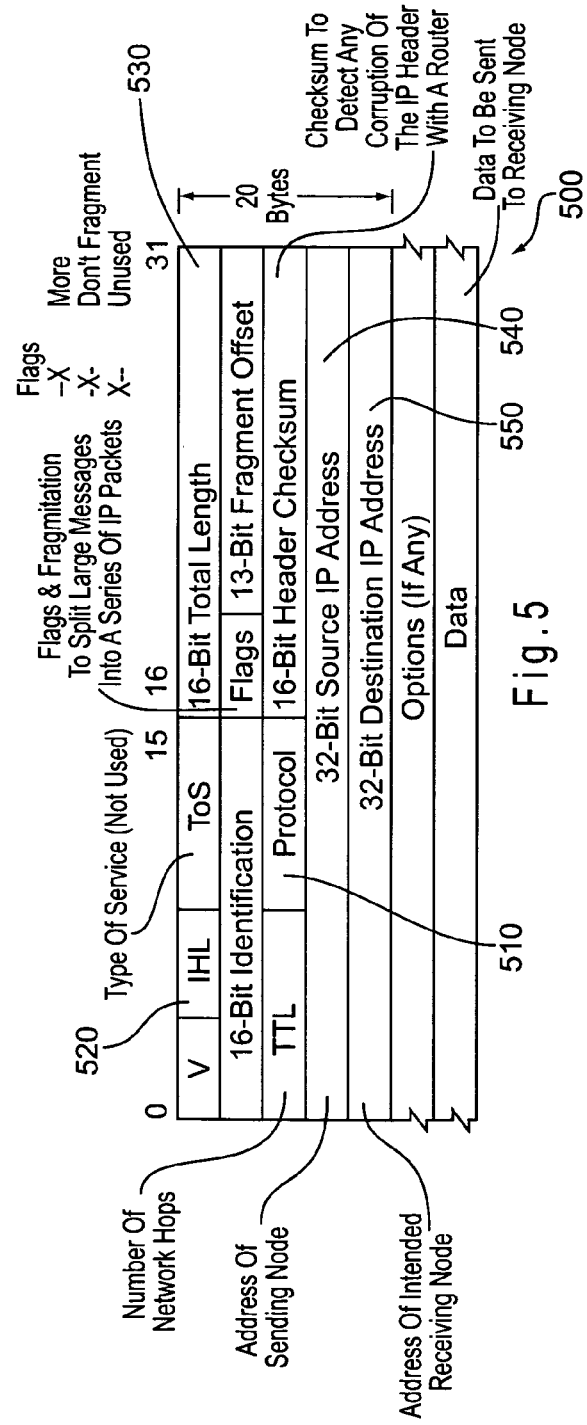
FIG. 5 is a diagram of an IP header.

FIG. 5 is a diagram of an IP header 500. Among other fields, the IP header 500 includes a protocol field 510 which identifies the type of transport protocol to be used, such as UDP. The IP header 500 also includes an IP header length field 520 which identifies the length of the header in 32-bit words. A size of datagram field 530 includes the size of the header plus the data. The IP header also includes a 32-bit source IP address 540 and a 32-bit destination IP address 550.

Figure 6:
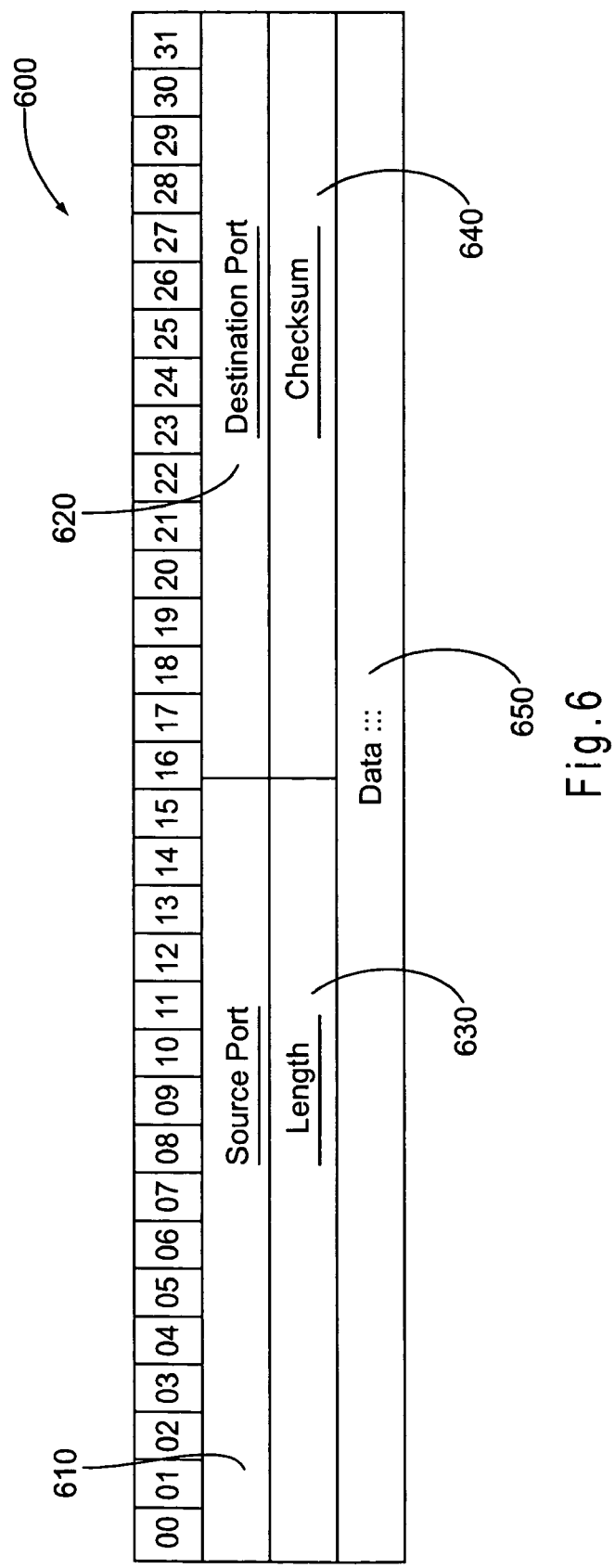
FIG. 6 is a diagram of a UDP header.

FIG. 6 is a diagram of a UDP header 600. The UDP header 600 includes a source port field 610 that is used to identify a port number of the sender. A destination port field 620 is also included which identifies a port that the packet is addressed to. A length field 630 includes the length, in bytes, of the UDP header and encapsulated data. A checksum field 640 may be used to help ensure an accurate transmission of data. The data is contained in a data filed 650.

Referring also to FIG. 3, at block 320, the router 210 uses the VoIP traffic from the extracted payload type field 460 of the RTP header 400 to identify the VoIP codec. At block 330, the router 210 determines and records the length of the packet, header plus data, from a packet length field of an IP header. At block 340, the router 210 determines and records the source IP address 540 and destination IP address 550 pair and the source/destination port number pair of the VoIP packet from the UDP header 600.

At block 350, the router 210 sends the recorded information to the OSS/NMS/EMS 220 for analysis. The OSS/NMS/EMS 220 may be implemented with the router 210 and/or separate therefrom. The customer or subscriber may be required, such as by service contract, to use a specified VoIP codec and determined packetization delay. For example, a service contract may require a G.711 codec with 20 ms delay. There are many different codecs that may be used by VoIP applications, such as G.711, G.729, G.723, G.726 and G.728. Packetization delay can vary from about 10 ms to about 50 ms. A customer or subscriber may use a wrong codec or packetiztion delay that causes network congestion and VoIP traffic loss. The communication service provider may use the information sent from the detection system 230 of the router 210 to the OSS/NMS/EMS 220 to determine a cause of the network problem and identify an incorrect codec/packetization delay and the source or sources of the misbehaved traffic. The OSS/NMS/EMS 220 may use the source/destination IP address and port number pairs to identify the subscribers that sent the VoIP traffic. Since VoIP uses out-of-band signaling architecture, packetization delay may not be directly available from the information sent by the router 210.

Figure 7:
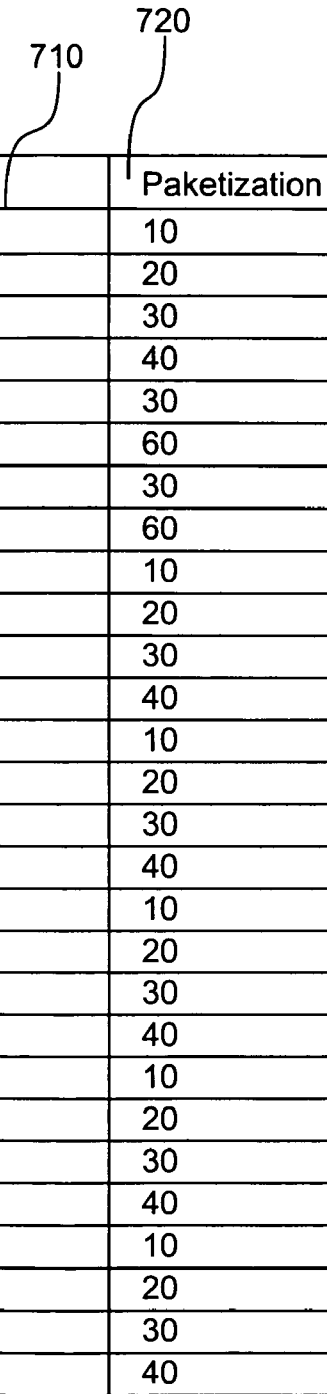
FIG. 7 is a table illustrating a mapping between packetization delay and codec/packet length.

FIG. 7 is a table 700 of a mapping between packetization delay and codec/packet length. The OSS/NMS/EMS 220 may include memory to store the table 700, such as a look-up table. A first column of the table 710 may include codecs and packet length information and a second column 720 may include corresponding packetization delays which may be determined beforehand through tests. The OSS/NMS/EMS 220 may determine the packetizaton delay from the table since the codec and packet length are known from the detection system 230. For example, a G.711 codec sending a packet 120 bytes long creates a delay of 10 ms. In this way, causes of network congestion may be accurately diagnosed and reported.

While the invention has been described above by reference to various embodiments, it will be understood that many changes and modifications can be made without departing from the scope of the invention. It is therefore intended that the foregoing detailed description be understood as an illustration of the presently preferred embodiments of the invention, and not as a definition of the invention. It is only the following claims, including all equivalents, which are intended to define the scope of this invention.

We claim:

1. A communications system for detecting packetization delay of packets in a network, the communications system comprising:
    a router to receive at least one packet containing data;
    a detection system in communication with the router, the detection system to extract a codec information and a packet length information from the packet;
    a management system in communication with the router, where the management system receives the codec information and the packet length information and determines packetization delay based on the codec information and the packet length information; and
    further including a look-up table that relates the codec information and the packet length information to packetization delay.

2. The communications system of claim 1, where the management system includes at least one of a network management system, an element management system and an operations support system.

3. The communications system of claim 1, where the detection system extracts the codec information from a header of a real-time transport protocol.

4. The communications system of claim 1, where the detection system extracts the packet length information from a header of an Internet protocol.

5. The communications system of claim 1, where the detection system comprises a software application stored in a memory of the router.

6. A method for detecting packetization delay of packets in a network, comprising:
    receiving at least one packet containing data;
    extracting a codec information and a packet length information from the packet; and
    determining packetization delay based on the codec information and the packet length information and further accessing a look-up table that relates the codec information and the packet length information to packetization delay.

7. The method of claim 6, further comprising determining the cause of congestion based on the determined packetization delay.

8. The method of claim 6, where the codec information is extracted from a header of a real-time transport protocol.

9. The method of claim 6, where the packet length information is extracted from a header of an Internet protocol.

10. The method of claim 6, further comprising reporting the cause of congestion.

11. A software application stored in a computer-readable memory, the software application for detecting packetization delay of packets in a network, comprising:
    a first routine to identify at least one packet containing data;
    a second routine to extract a codec information and a packet length information from the packet; and
    a third routine to determine packetization delay based on the codec information and the packet length information, where the third routine accesses a look-up table that relates the codec information and the packet length information to packetization delay.

12. The software application of claim 11, further including a fourth routine to determine a cause of congestion based on the determined packetization delay.

13. The software application of claim 11, where the second routine extracts the codec information from a header of a real-time transport protocol.

14. The software application of claim 11, where the second routine extracts the packet length information from a header of an Internet protocol.

* * * * *